United States Patent
Iwamura et al.

(10) Patent No.: US 8,116,194 B2
(45) Date of Patent: Feb. 14, 2012

(54) OPTICAL INFORMATION RECORDING METHOD, OPTICAL INFORMATION RECORDING MEDIUM, OPTICAL INFORMATION REPRODUCING DEVICE, OPTICAL INFORMATION REPRODUCING METHOD AND OPTICAL INFORMATION RECORDING AND REPRODUCING DEVICE

(75) Inventors: Takashi Iwamura, Kanagawa (JP); Mitsuaki Oyamada, Kanagawa (JP); Daisuke Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 12/530,474

(22) PCT Filed: Jan. 8, 2009

(86) PCT No.: PCT/JP2009/050496
§ 371 (c)(1),
(2), (4) Date: Sep. 9, 2009

(87) PCT Pub. No.: WO2009/088095
PCT Pub. Date: Jul. 16, 2009

(65) Prior Publication Data
US 2010/0110858 A1    May 6, 2010

(30) Foreign Application Priority Data
Jan. 11, 2008    (JP) .................. 2008-004998

(51) Int. Cl.
*G11B 7/00*    (2006.01)
(52) U.S. Cl. ....................... 369/284; 428/64.4
(58) Field of Classification Search ........... None
See application file for complete search history.

(56) References Cited

U.S. PATENT DOCUMENTS
2004/0028869 A1 *  2/2004  Terao et al. .................. 428/64.4

FOREIGN PATENT DOCUMENTS
| JP | 04-062090 | 2/1992 |
| JP | 2002-063722 | 2/2002 |
| JP | 2004-020822 | 1/2004 |
| JP | 2005-037658 | 2/2005 |

OTHER PUBLICATIONS

Fracesco, S., et al.; Journal of American Chemistry, 2003, 125, 328 to 329.*
International Search Report dated Jan. 11, 2008.

* cited by examiner

*Primary Examiner* — Joseph Haley
(74) *Attorney, Agent, or Firm* — SNR Denton US LLP

(57) ABSTRACT

The invention is able to enhance a recording speed. In the invention, a recording mark (RM) composed of a cavity is formed by vaporizing a two-photon absorbing material by a two-photon absorption reaction as an embodiment of a photoreaction against a recording light beam (L1) as recording light to be condensed at the time of recording information. Also, in a recording layer (101), the information is reproduced on the basis of a return light beam (L3) formed by modulation of a readout light beam (L2) irradiated as prescribed readout light at the time of reproducing inform in conformity with the presence of absence of the recording mark (RM). Then, in the recording layer (101), in view of the fact that the a two-photon absorbing particle having a two-photon absorbing material coordinated with a metal fine particle (MN) is dispersed in a binder resin configuring the recording layer (101), the two-photon absorbing material having a two-photon absorbing characteristic is disposed as a vaporizable material in the vicinity of the metal fine particle (MN) dispersed in the binder resin.

7 Claims, 9 Drawing Sheets

[FIG. 1]
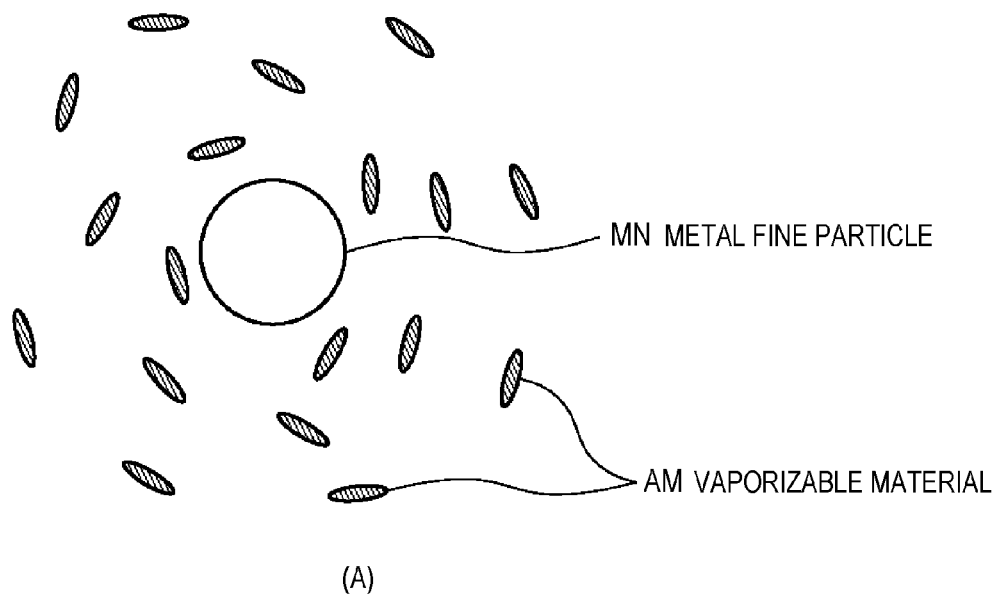
(A)
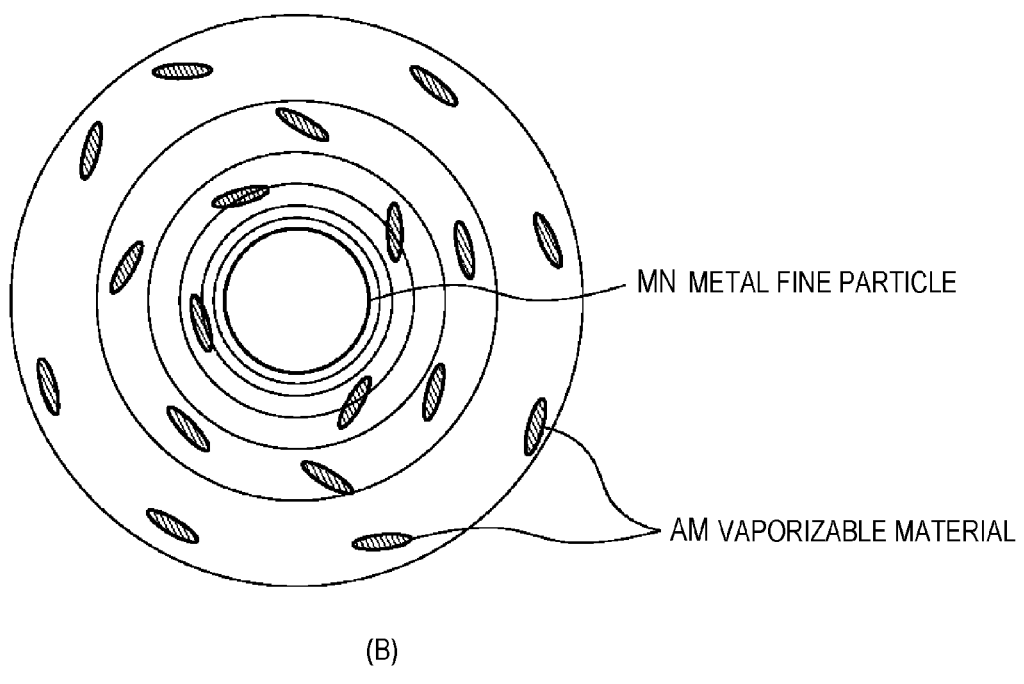
(B)

[FIG. 2]
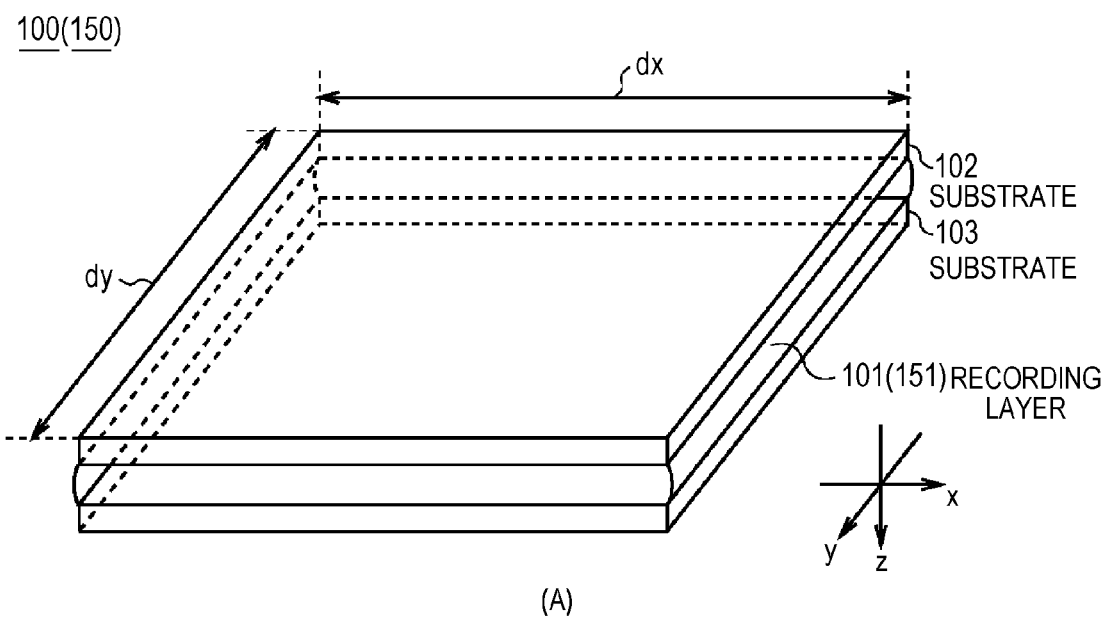
(A)
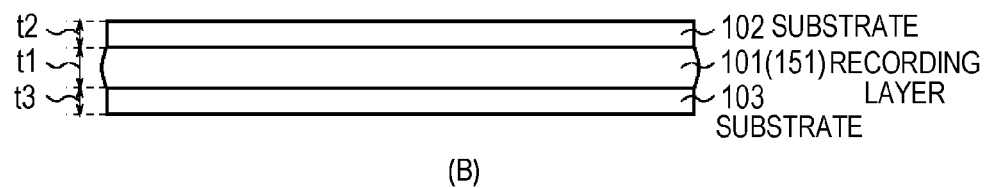
(B)

[FIG. 3]
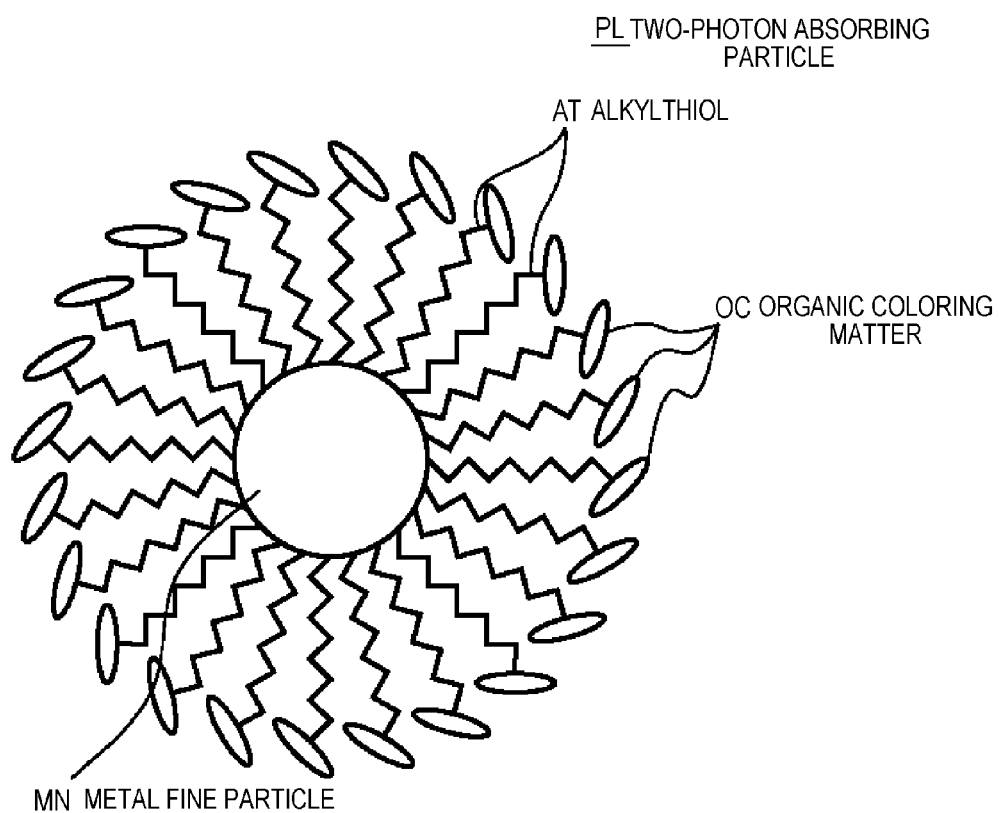

[FIG. 4]
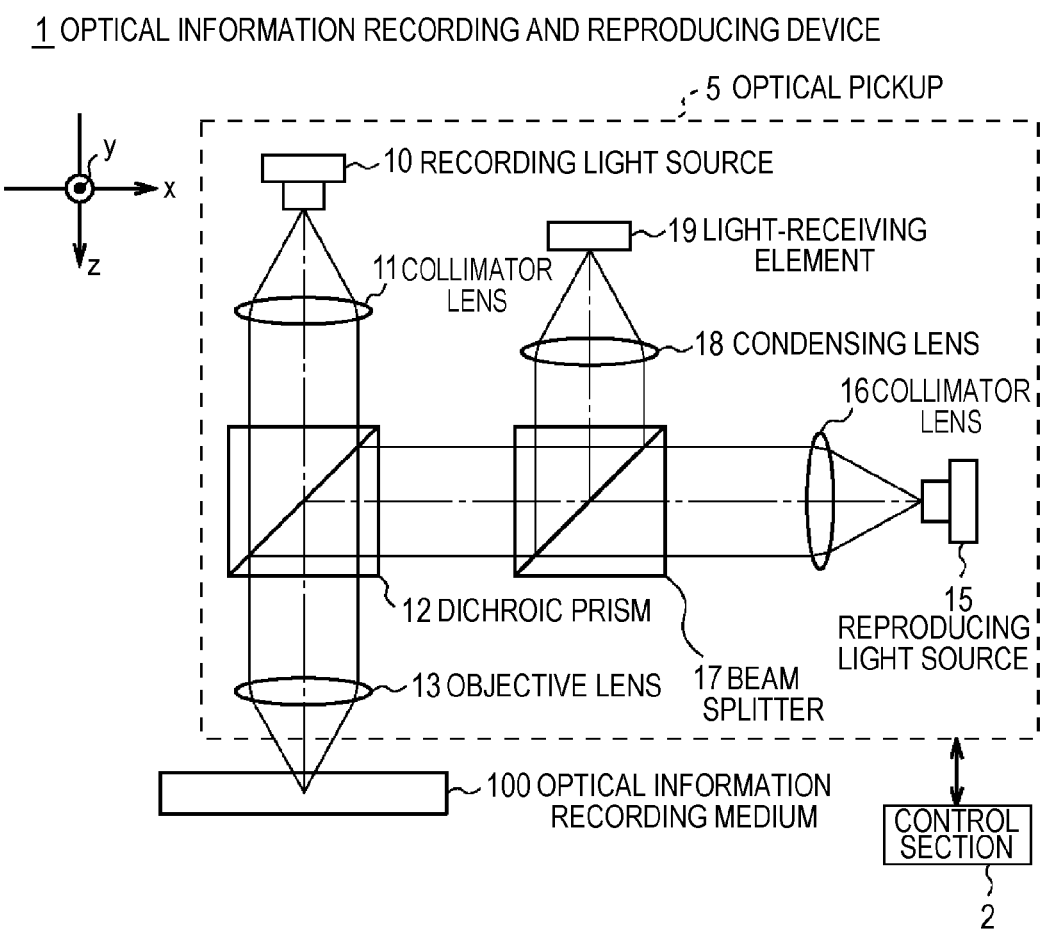

[FIG. 5]
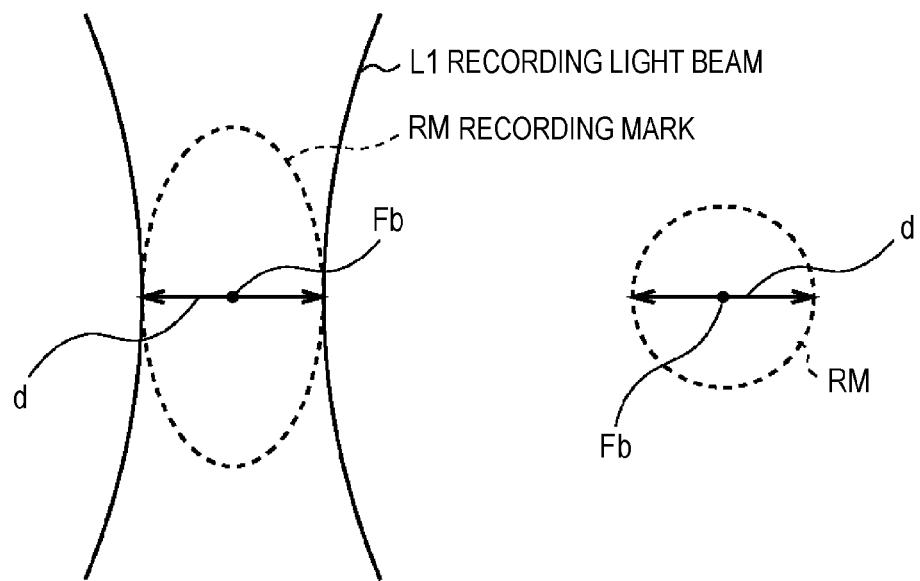
[FIG. 6]
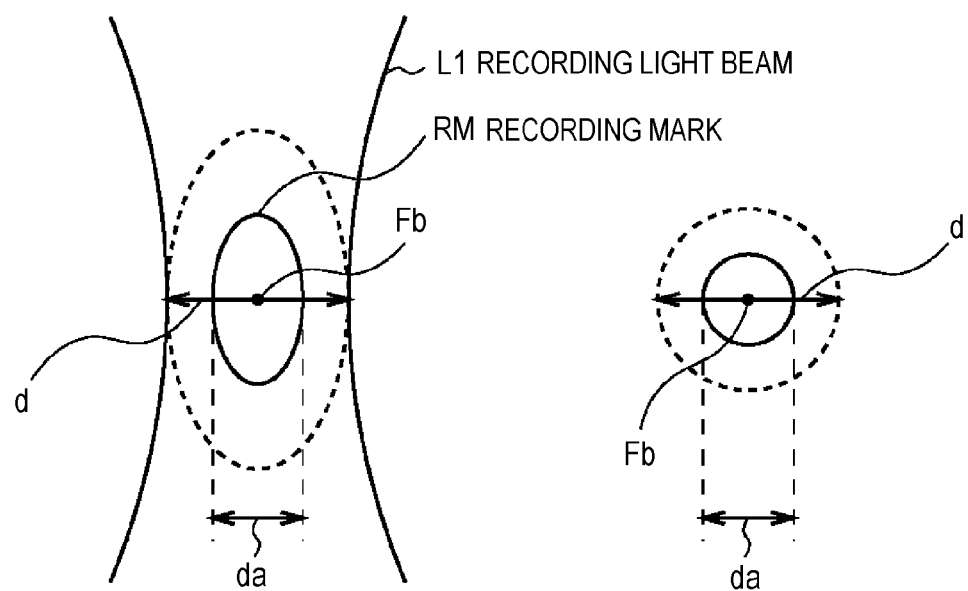

[FIG. 7]
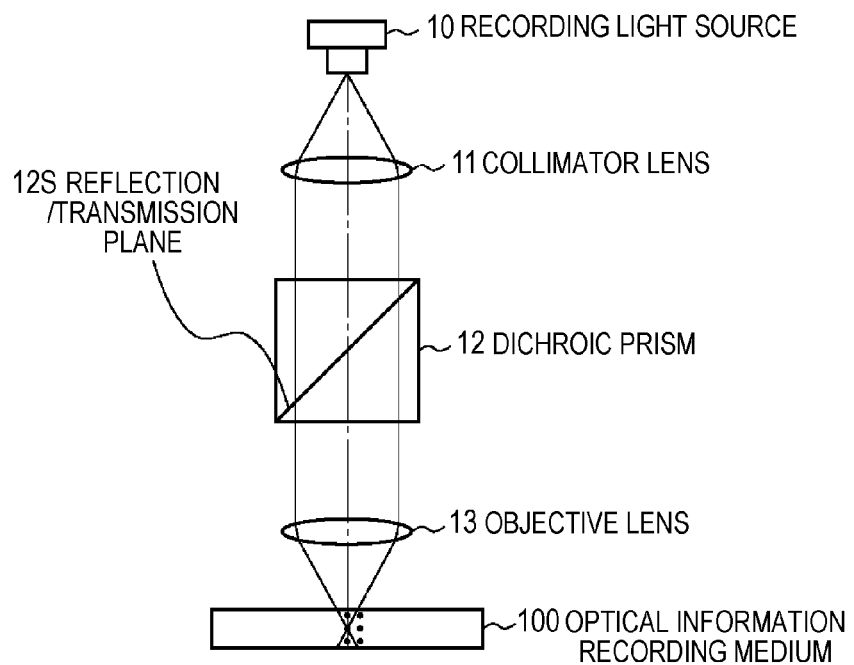
[FIG. 8]
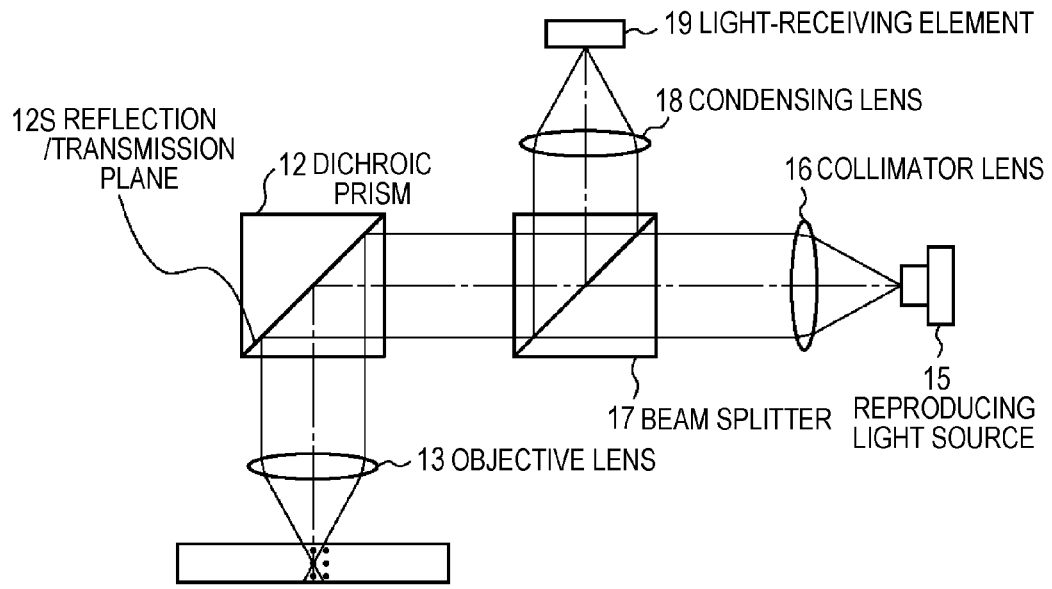

[FIG. 9]
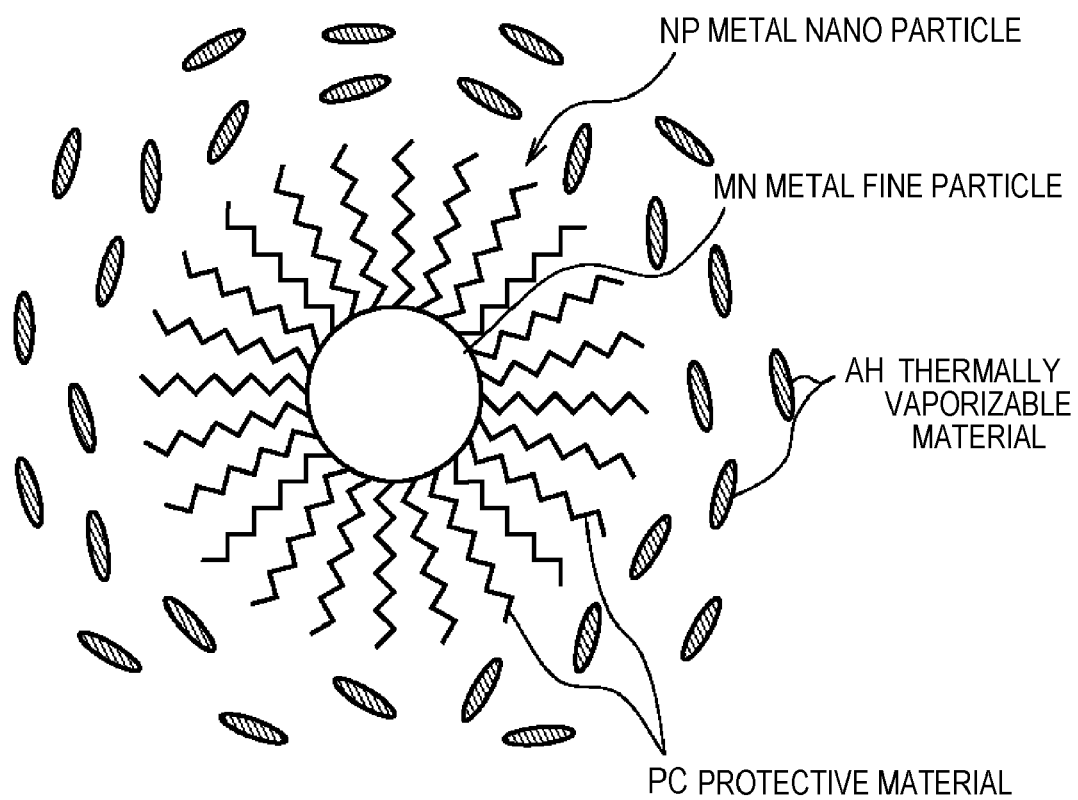

[FIG. 10]
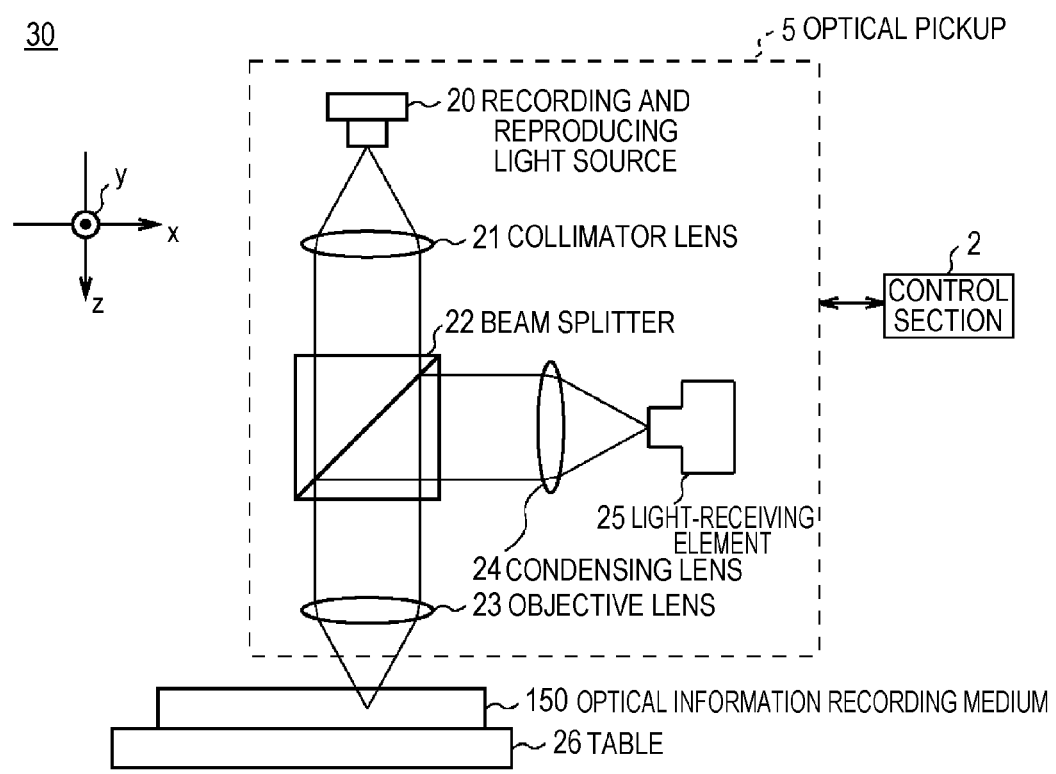

[FIG. 11]
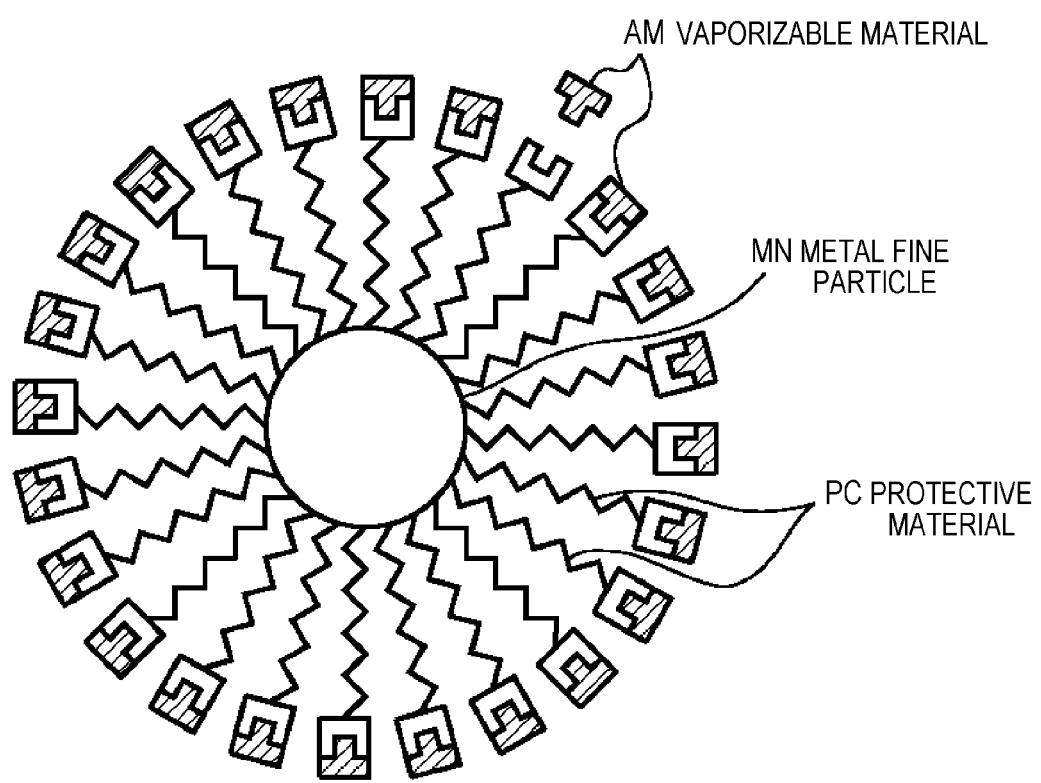

OPTICAL INFORMATION RECORDING METHOD, OPTICAL INFORMATION RECORDING MEDIUM, OPTICAL INFORMATION REPRODUCING DEVICE, OPTICAL INFORMATION REPRODUCING METHOD AND OPTICAL INFORMATION RECORDING AND REPRODUCING DEVICE

TECHNICAL FIELD

The present invention relates to an optical information recording method, an optical information recording medium, an optical information reproducing device, an optical information reproducing method and an optical information recording and reproducing device and is suitable when applied to, for example, an optical information recording medium in which information is recorded by using a light beam, and the information is reproduced by using the light beam.

BACKGROUND ART

As optical information recording media, disc-shaped optical information recording media have hitherto widely diffused, and in general, CD (compact disc), DVD (digital versatile disc), Blu-ray Disc (a registered trademark; hereinafter referred to as "BD") and the like are used.

On the other hand, in optical information recording and reproducing devices corresponding to such an optical information recording medium, information of every sort, for example, various contents such as music contents, screen image contents, etc., various data for computer, or the like is recorded. In particular, in recent years, an amount of information increases due to high definition of screen images, high tone quality of music, etc., and an increase of the number of contents for recording on a single optical information recording medium is required, and therefore, the optical information recording medium is required to have a larger capacity.

Then, as one of techniques for making an optical information recording medium have a large capacity, there is proposed an optical information recording medium in which a material for forming a recording pit by two-photon absorption is used, and a laser light source having a high peak power is used, thereby three-dimensionally recording information in a thickness direction of the optical information recording medium (see, for example, Patent Document 1).

Patent Document 1: JP-A-2005-37658

However, the optical information recording medium having such a configuration involved a problem that the sensitivity to a light beam is low, the light beam must be irradiated for a long time to some extent for the purpose of forming a recording mark, and the recording speed is low.

DISCLOSURE OF THE INVENTION

Taking into account the foregoing facts, the invention has been made and is to propose an optical information recording method and an optical information recording medium, each of which is able to enhance a recording speed; and an optical information reproducing device, an optical information reproducing method and an optical information recording and reproducing device, each of which is able to make a reproducing characteristic of the optical information recording medium good.

In order to solve such a problem, in the invention, an optical information recording medium having a vaporizable material disposed in the vicinity of a metal fine particle dispersed in a resin has been provided with a recording step of vaporizing the vaporizable material by a photoreaction or thermal reaction against recording light to be condensed at the time of recording information, thereby forming a recording mark composed of a cavity.

According to this, an electric field in the vicinity of the metal fine particle can be reinforced several hundred times to several thousand times by a surface plasmon effect to be caused by the metal fine particle, and the photoreaction or thermal reaction against the recording light can be accelerated.

Also, in the invention, there has been provided a recording layer in which a vaporizable material is disposed in the vicinity of a metal fine particle dispersed in a resin, a recording mark composed of a cavity is formed by vaporizing the vaporizable material by a photoreaction or thermal reaction against recording light to be condensed at the time of recording information, and in irradiating prescribed readout light at the time of reproducing information, the information is reproduced on the basis of the readout light modulated in conformity with the presence or absence of the recording mark.

According to this, an electric field in the vicinity of the metal fine particle can be reinforced several hundred times to several thousand times by a surface plasmon effect to be caused by the metal fine particle, and the photoreaction or thermal reaction against the recording light can be accelerated.

Furthermore, in the invention, there have been provided an objective lens for condensing recording light with a prescribed wavelength and irradiating it, thereby condensing readout light outputted from a prescribed reproducing light source and having a shorter wavelength than the recording light and irradiating it on an optical information recording medium having a recording mark composed of bubbles formed by a photoreaction by two-photon absorption; and a light detection section for detecting the readout light modulated in conformity with the presence or absence of the recording mark in the optical information recording medium.

According to this, it is possible to irradiate the readout light which is coincident with the recording mark formed smaller than an optical information recording medium with single-photon absorption.

Furthermore, in the invention, there have been provided a readout light irradiation step of condensing recording light with a prescribed wavelength and irradiating it, thereby condensing readout light having a shorter wavelength than the recording light and irradiating it on an optical information recording medium having a recording mark composed of bubbles formed by a photoreaction by two-photon absorption; and a light detection step of detecting the readout light modulated in conformity with the presence or absence of the recording mark in the optical information recording medium.

According to this, it is possible to irradiate the readout light which is coincident with the recording mark formed smaller than an optical information recording medium with single-photon absorption.

Furthermore, there have been provided a first light source for outputting recording light with a prescribed wavelength; a second light source for outputting readout light having a shorter wavelength than the recording light; an objective lens which at the time of recording information, condenses the recording light and irradiates it on an optical information recording medium, thereby forming a recording mark composed of bubbles by a photoreaction by two-photon absorption in the optical information recording medium and which at the time of reproducing the information, condenses the readout light and irradiates it on the optical information recording medium; and a light detection section for detecting the readout light modulated in conformity with the presence or absence of the recording mark in the optical information recording medium.

According to this, it is possible to irradiate the readout light which is coincident with the recording mark formed smaller than an optical information recording medium with single-photon absorption.

According to the invention, it is possible to realize a recording method and an optical information recording medium, in which an electric field in the vicinity of the metal fine particle can be reinforced several hundred times to several thousand times by a surface plasmon effect to be caused by the metal fine particle, and the photoreaction or thermal reaction against the recording light can be accelerated, whereby a recording speed can be enhanced.

Also, according to the invention, it is possible to realize an optical information reproducing device, an optical information reproducing method and an optical information recording and reproducing device, in which the readout light which is coincident with the recording mark formed smaller than an optical information recording medium with single-photon absorption can be irradiated, whereby a reproducing characteristic of the optical information recording medium can be made good.

BRIEF DESCRIPTION OF THE DRAWINGS

FIG. 1 is a diagrammatic line view for providing the explanation of a principle of the invention.

FIG. 2 is a diagrammatic line view showing a configuration of an optical information recording medium.

FIG. 3 is a diagrammatic line view schematically showing a two-photon absorbing particle.

FIG. 4 is a diagrammatic line view showing a configuration of an optical information recording and reproducing device according to the First Embodiment.

FIG. 5 is a diagrammatic line view for providing the explanation of formation of a recording mark by single-photon absorption.

FIG. 6 is a diagrammatic line view for providing the explanation of formation of a recording mark by two-photon absorption.

FIG. 7 is a diagrammatic line view for providing the explanation of recording of information.

FIG. 8 is a diagrammatic line view for providing the explanation of reproducing of information.

FIG. 9 is a diagrammatic line view for providing the explanation of disposition of a vaporizable material in the vicinity of a metal fine particle.

FIG. 10 is a diagrammatic line view showing a configuration of an optical information recording and reproducing device according to the Second Embodiment.

FIG. 11 is a diagrammatic line view for providing the explanation of disposition of a vaporizable material in the vicinity of a metal fine particle according to other embodiment.

BEST MODES FOR CARRYING OUT THE INVENTION

An embodiment of the invention is hereunder described in detail with reference to the drawings.

(1) Principle

In general, it is known that in a metal fine particle MN of gold, silver, etc. with a nano size (from about 1 to 100 nm), when irradiated with light under a prescribed condition, an electric field in the vicinity of the metal fine particle MN is reinforced due to a surface plasmon effect for causing resonance upon being coupled with electromagnetic waves, thereby reinforcing a light intensity several hundred times to several thousand times.

In the invention, not only the metal fine particle MN is dispersed within a recording layer 101 in an optical information recording medium 100, but a vaporizable material AM which is vaporized by a photoreaction or thermal reaction in conformity with the irradiation with light is disposed in the vicinity of the metal fine particle MN.

When light is irradiated in the vicinity of the metal fine particle MN, the light intensity in the vicinity of the metal fine particle MN is reinforced several hundred times to several thousand times due to the surface plasmon effect. As a result, it is expected that the same effect is obtainable as in the case of irradiating the optical information recording medium 100 with light having a light intensity of several hundred times to several thousand times the light intensity of actually irradiated light.

That is, in the optical information recording medium 100, when a recording light beam L1 for information recording is irradiated as light, the electric field in the vicinity of the metal fine particle MN is reinforced due to the surface plasmon effect. As a result, the optical information recording medium 100 accelerates a photoreaction or thermal reaction of the vaporizable material AM which is contained in the recording layer 101 in the vicinity of a focus Fb and rapidly vaporizes the vaporizable material AM, whereby a recording mark RM composed of bubbles can be rapidly formed in the focus Fb.

As shown in FIG. 1(B), with respect to this surface plasmon effect, it is known that the closer the surface of the metal fine particle MN, the larger the reinforcing effect of the electric field; and that the electric field becomes small in conformity with a square of a distance from the surface. It is desirable that the vaporizable material AM is disposed as close to the metal fine particle MN as possible.

(2) First Embodiment (2-1) Configuration of Optical Information Recording Medium As shown in FIGS. 2(A) and 2(B), the recording layer 101 is formed between substrates 102 and 103, thereby allowing the optical information recording medium 100 to function as a medium for recording information as a whole.

The substrates 102 and 103 are each made of a glass substrate and allows light to transmit therethrough in a high proportion. Also, the substrates 102 and 103 are each configured in a regular square shape or rectangular shape with a length dx in the X-direction and a length dy in the Y-direction of about 50 mm and thicknesses t2 and t3 of from about 0.6 to 1.1 mm.

The outside surface of each of the substrates 102 and 103 (surface not coming into contact with the recording layer 101) is subjected to an AR (antireflection coating) treatment of a multilayered inorganic layer (for example, four layers of $Nb_2O_2/SiO_2/Nb_2O_5/SiO_2$) such that it is non-reflective against a light beam having a wavelength of, for example, 405 nm and 780 nm.

The substrates 102 and 103 are not limited to a glass plate, but various optical materials, for example, acrylic resins, polycarbonate resins, etc. can be used. The thicknesses t2 and t3 of the substrates 102 and 103 are not limited to the foregoing but can be properly chosen within the range of from 0.05 mm to 1.2 mm. The thicknesses t2 and t3 may be the same or different. Also, the outside surface of each of the substrates 102 and 103 may be not always subjected to the AR treatment.

In the recording layer 101, the metal fine particle MN covered by a two-photon absorbing material which absorbs two photons from a light beam and expands (hereinafter referred to as "two-photon absorbing particle") is dispersed in a binder resin serving as a main component.

As the binder resin, various resin materials having a high transmittance against a light beam can be used. For example, thermoplastic resins which are softened by heat, photosetting type resins which are cured by a crosslinking or polymerization reaction by light, thermosetting type resins which are cured by a crosslinking or polymerization reaction by heat and so on can be used.

Though the resin material is not particularly limited, from the viewpoints of weather resistance, light transmittance and the like, it is preferred to use a PMMA (polymethyl methacrylate) resin, a polycarbonate resin, etc.

As the metal fine particle MN serving as a nucleus of the two-photon absorbing particle, various metals, for example, Au, Ag, Pd, Pt, Rh, Ru, etc. can be used. By using Au or Ag, a large electric field reinforcing effect due to the surface plasmon effect can be obtained in view of characteristics as the metal. Also, by using Ag as the metal, it is possible to obtain the surface plasmon effect even in a short wavelength of, for example, not more than 600 nm.

As the two-photon absorbing material, a material having a characteristic of absorbing two photons from a light beam and expanding is used. The expansion by this two-photon absorption refers to a reaction not relying upon thermal decomposition, namely a reaction to be caused in a photon mode. Specifically, as the two-photon absorbing material, various coloring matters, for example, cyanine coloring matters, merocyanine coloring matters, arylidene coloring matters, oxonol coloring matters, squalium coloring matters, azo coloring matters, phthalocyanine coloring matters, etc., various inorganic crystals and the like can be used.

With respect to this two-photon absorbing material, the wavelength exhibiting two-photon absorption is not particularly limited. For example, by using, as the two-photon absorbing material, a material which exhibits two-photon absorption against the recording light beam L1 (for example, 780 nm) which is used for the information recording processing but does not substantially exhibit absorption against a readout light beam L2 (for example, 405 nm) which is used for the information reproducing processing, durability against the readout light beam L2 can be enhanced.

Also, as the two-photon absorbing material, it is preferable that the material has a terminal group having a characteristic to coordinate with the metal fine particle MN (hereinafter referred to as "coordinated terminal group"), for example, thiols, amines, carboxylic acids, etc. By using a material having such a coordinated terminal group, the metal fine particle MN can be easily covered by the two-photon absorbing material.

Furthermore, as the two-photon material, it is preferable that the material has, for example, an alkyl chain whose terminal is substituted with a coordinated terminal group (hereinafter referred to as "coordinated alkyl chain") as a part of the organic coloring matter having a two-photon absorbing characteristic. Such a two-photon material can be formed by, for example, adding a coordinated alkyl chain to an organic coloring matter or substituting a part of a structure which an organic coloring matter has with a coordinated alkyl chain.

As this two-photon absorbing material, an alkanethiol derivative having, as a side chain, an alkylthio group having a characteristic to easily coordinate with the metal fine particle MN, which is represented by, for example, the formula (1), is favorably used.

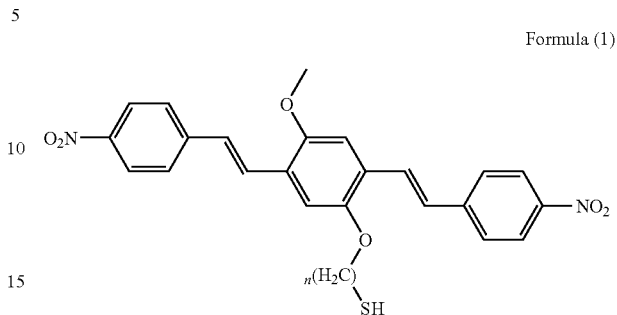

Formula (1)

According to this, as shown in FIG. 3, the alkylthiol group can be coordinated with the metal fine particle MN, and the organic coloring matter OC having a two-photon absorbing characteristic can be surely disposed in the vicinity of the metal fine particle MN.

According to this, in a two-photon absorbing particle PL, the organic coloring matter OC can be surely disposed in a place where a reinforcing effect of an electric field is large, and therefore, a two-photon absorption reaction of the organic coloring matter OC can be accelerated at a maximum.

Specifically, the two-photon absorbing particle PL using, for example, Ag as the metal fine particle MN can be prepared by stirring silver nitrate ($AgNO_3$) as an ethanol solution together with $NaBH_4$ as a reducing agent and an alkanethiol derivative at 0° C.

It has been confirmed that in the thus prepared two-photon absorbing particle PL, the organic coloring matter OC in the alkanethiol derivative assumes two-photon absorption without losing its characteristics (see Non-Patent Document 1).

Non-Patent Document 1: Francesco, S., et al.; *J. Am. Chem. Soc.*, 2003, 125, 328 to 329

Then, by volatilizing ethanol, the two-photon absorbing particle PL in a powdered form (hereinafter referred to as "powdered particle") can be obtained.

This powdered particle can be easily dispersed in a liquid such as organic solvents, etc. upon being mixed and stirred and besides, can be dispersed in a resin material of every sort upon being kneaded.

For example, in the case of using a thermoplastic resin as the binder resin, the powdered particle is added to the heated thermoplastic resin, and the mixture is kneaded by a kneader, thereby dispersing the two-photon absorbing particle in the binder resin.

Then, the binder resin having the two-photon absorbing particle PL dispersed therein is spread on the substrate 103 and cooled to prepare the recording layer 101, and thereafter, the substrate 102 is allowed to adhere to the recording layer 101 by using, for example, a UV adhesive, whereby the optical information recording medium 100 can be prepared.

Also, in the case of diluting a thermoplastic resin with an organic solvent, etc. (this thermoplastic resin will be hereinafter referred to as "solvent dilution type resin" and distinguished from a thermoplastic resin to be molded by heating), the two-photon absorbing particle PL can be dispersed in the binder resin by previously dispersing the powdered particle in an organic solvent and then dissolving the solvent dilution type resin in the organic solvent, or by adding the powdered particle in the solvent dilution type resin diluted with an organic solvent and stirring the mixture.

Then, the binder resin having the two-photon absorbing particle PL dispersed therein is spread on the substrate 103 and heated for drying to prepare the recording layer 101, and thereafter, the substrate 102 is allowed to adhere to the recording layer 101 by using, for example, a UV adhesive, whereby the optical information recording medium 100 can be prepared.

Furthermore, in the case of using a thermosetting resin or a photosetting resin as the binder resin, the powdered particle is added to an uncured resin material and stirred, thereby dispersing the two-photon absorbing particle PL in the binder resin.

Then, the binder resin having the two-photon absorbing particle PL dispersed therein is spread on the substrate 103 and photo-cured or thermo-cured in a state where the substrate 103 is placed on the uncured recording layer 101, whereby the optical information recording medium 100 can be prepared.

(2-2) Configuration of Optical Information Recording and Reproducing Device

In FIG. 4, in an optical information recording and reproducing device 1, by irradiating light on the recording layer 101 in the optical information recording medium 100 as a whole, information is recorded in plural hypothetic recording mark layers (hereinafter referred to as "virtual recording mark layer") in the recording layer 101, and the information is reproduced.

In the optical information recording and reproducing device 1, the whole is subjected to general control by a control section 2 which is configured of CPU (central processing unit), and a basic program or a program of every sort such an information recording program, an information reproducing program, etc. is read out from non-illustrated ROM (read only memory) and developed into non-illustrated RAM (random access memory), thereby executing processing of every sort such as information recording processing, information reproducing processing, etc.

In the control section 2, by controlling an optical pickup 5, a light beam is irradiated at a position at which the light beam of the optical information recording medium 100 is to be irradiated (hereinafter referred to as "target mark position") from the optical pickup 5, and the light beam which has returned from the optical information recording medium 100 is received.

Here, in general, when a numerical aperture of the objective lens is defined as NA, and a wavelength of the light beam is defined as $\lambda$, a spot size d when the light beam is condensed is expressed by the following equation.

$$d = \frac{\lambda}{NA} \quad (1)$$

That is, in the case of using the same objective lens 13, since the numerical number NA becomes constant, the spot size d is in proportion to the wavelength $\lambda$ of the light beam.

As shown in FIG. 5, the intensity of the condensed light beam becomes the largest in the vicinity of the focus Fb and becomes small as it is isolated from the focus Fb. For example, in the case of a general optical information recording medium in which the recording mark RM is formed by single-photon absorption, since a photoreaction is caused by absorbing a single photon, the photoreaction is caused in proportion to the light intensity. For that reason, in the optical information recording medium, the recording mark RM is formed in a region where the intensity becomes a prescribed value or more in the recording light beam L1. FIG. 5 shows the case where the recording mark RM having the same size as the spot size d is formed.

On the other hand, in the case of two-photon absorption, since the reaction is caused only when two photons are absorbed at the same time, the photoreaction is caused in proportion to a square of the light intensity. For that reason, in the optical information recording medium 100 according to this embodiment, as shown in FIG. 6, the recording mark RM is formed only in the vicinity of the focus Fb having a very large light intensity in the recording light beam L1.

This recording mark RM has a smaller size than the spot size d of the recording light beam L1, and its diameter da is small. For that reason, in the optical information recording medium 100, it becomes possible to realize a mass storage capacity by forming the recording mark RM in a high density. However, assuming that the readout light beam L2 with the same wavelength as the recording light beam L1 is irradiated, not only a proportion of the readout light beam L2 which is not irradiated directly on the recording mark RM becomes larges, thereby increasing a loss of the readout light beam L2, but there is a possibility of the generation of so-called crosstalk such that the readout light beam L2 is reflected by the recording mark RM adjacent to the target mark position and interferes with a return light beam L3.

The optical pickup 5 in the optical information recording and reproducing device 1 in this embodiment has a recording light source 10 and a reproducing light source 15 as light sources, and in the information recording processing, the recording light beam L1 with 780 nm is used, whereas in the information reproducing processing, the readout light beam L2 with 405 nm is used.

The recording light source 10 is a semiconductor laser capable of pulse outputting the recording light beam L1 on a picosecond level (so-called picosecond laser). On the other hand, the reproducing light source 15 is a general semiconductor laser which is used for an optical disc drive such as BD (Blu-ray Disc, a registered trademark), etc.

As shown in FIG. 7, in the optical pickup 5, in the information recording processing, the recording light beam L1 having a wavelength of 780 nm is outputted from the recording light source 10 on the basis of control of the control section 2, and the recording light beam. L1 is converted from divergent light to parallel light by a collimator lens 11, followed by making the light incident into a dichroic prism 12.

The dichroic prism 12 has a reflection/transmission plane 12S for reflecting a light beam or allowing it to transmit therethrough in conformity with the wavelength. When the recording light beam L1 is made incident, the reflection/transmission plane 12S allows the recording light beam L1 to transmit therethrough and makes it incident into the objective lens 13. The objective lens 13 condenses the recording light beam L1 to focus it on an arbitrary place within the optical information recording medium 100, thereby forming the recording mark RM composed of bubbles.

At that time, in the optical information recording medium 100, not only the recording mark RM is rapidly formed by the surface plasmon effect by the metal fine particle MN, but the recording mark RM having the diameter da which is smaller than the spot size d of the recording light beam L1 is formed in the vicinity of the focus Fb of the recording light beam L1.

Also, as shown in FIG. 8, in the optical pickup 5, in the information reproducing processing, the readout light beam L2 having a wavelength of 405 nm is outputted from the reproducing light source 15 on the basis of control of the control section 2, and the readout light beam L2 is converted from divergent light to parallel light by a collimator lens 16, followed by making the light incident into a beam splitter 17.

The beam splitter 17 allows the readout light beam L2 to transmit therethrough in a prescribed proportion and makes it incident into the dichroic prism 12.

The dichroic prism 12 reflects the readout light beam L2 by the reflection/transmission plane 12S and makes it incident into the objective lens 13. The objective lens 13 condenses the readout light beam L2 to focus it on an arbitrary place within the optical information recording medium 100.

Here, in the case where the recording mark RM is formed at the focusing position of the readout light beam L2, the optical information recording medium 100 reflects the readout light beam L2 due to a difference in refractive index between the recording layer 101 and the recording mark RM, thereby producing the return light beam L3. Also, in the case where the recording RM is not formed at the focusing position of the readout light beam L2, the optical information recording medium 100 allows the readout beam L2 to pass therethrough and does not produce the return light beam L3.

In the case where the return light beam L3 has returned from the optical information recording medium 100, the objective lens 13 converts the return light beam L3 to parallel light and makes it incident into the dichroic prism 12. At that time, the dichroic prism 12 reflects the return light beam L3 by the reflection/transmission plane 12S and makes it incident into the beam splitter 17.

The beam splitter 17 reflects a part of the return light beam L3 and makes it incident into a condensing lens 18. The condensing lens 18 condenses the return light beam L3 and irradiates it on a light-receiving element 19.

In response to this, the light-receiving element 19 detects the quantity of light of the return light beam L3, produces a detection signal corresponding to the quantity of light and sends out it into the control section 2. According to this, the control section 2 is able to recognize a detection state of the return light beam L3 on the basis of the detection signal.

The optical pickup 5 is provided with a non-illustrated drive section and is able to freely move in three axis directions of the X-direction, Y-direction and Z-direction due to control of the control section 2. Actually, in the control section 2, by controlling the position of the optical pickup 5, the focusing position of each of the recording light beam L1 and the readout light beam L2 can be allowed to conform to a desired target mark position.

In the light of the above, in the optical information recording and reproducing device 1, not only the recording mark RM which is smaller than the spot size d of the recording light beam L1 is formed by a photoreaction of the two-photon absorbing material, but the readout light beam L2 having a spot size smaller than that of the recording light beam L1 is irradiated. According to this, the optical information recording and reproducing device 1 is able to irradiate the readout light beam L2 having a spot size suited for the recording mark RM and is able to control a loss or crosstalk of the readout light beam L2.

(2-3) Action and Effect

In the foregoing configuration, in the recording layer 101 in the optical information recording medium 100, the two-photon absorbing material is vaporized by a two-photon absorption reaction which is an embodiment of the photoreaction against the recording light beam L1 as recording light to be condensed at the time of recording information, thereby forming the recording mark RM composed of a cavity. Also, in the recording layer 101, the readout light beam L2 irradiated as prescribed readout light at the time of reproducing the information reproduces the information on the basis of the return light beam. L3 modulated in conformity with the presence or absence of the recording mark RM.

Then, in the recording layer 101, by dispersing the two-photon absorbing particle having a two-photon absorbing material coordinated with the metal fine particle MN in the binder resin constituting the recording layer 101, the two-photon absorbing material having a two-photon absorbing characteristic is disposed as a vaporizable material in the vicinity of the metal fine particle MN dispersed in the binder resin.

According to this, in the recording layer 101, in the information recording processing, an electric field in the vicinity of the metal fine particle MN can be reinforced several hundred times to several thousand times due to a surface plasmon effect to be caused by irradiation of the recording light beam L1 on the metal fine particle MN. As a result, in the recording layer 101, an optical effect against the two-photon absorbing material existing in the vicinity of the target mark position is enhanced several hundred times to several thousand times to rapidly vaporize the two-photon absorbing material, whereby the recording mark RM can be formed.

Furthermore, in the recording layer 101, since a recording sensitivity to the recording light beam L1 can be enhanced, energy of the recording light beam L1 which is necessary for forming the recording mark RM can be lowered. For that reason, in the recording layer 101, it is possible to use, as the recording light source 10, a picosecond laser composed of a semiconductor laser but not a femtosecond laser capable of outputting laser light with an extremely high light intensity, and the configuration as the optical information recording and reproducing device 1 can be simplified.

Also, in general, it is known that a probability that the two-photon absorbing material causes two-photon absorption is in proportion to a square of the light intensity. For that reason, the recording layer 101 is able to absorb the recording light beam L1 in the vicinity of the focus Fb of the recording light beam L1, namely only nearby the target mark position and is not substantially required to absorb the recording light beam L1 in a virtual recording mark layer (hereinafter referred to as "other recording mark layer") which is different from the virtual recording mark layer belonging to the target mark position (hereinafter referred to as "irradiating recording mark layer").

As a result, in the recording layer 101, the transmittance against the recording light beam L1 as the whole of the recording layer 101 can be enhanced, and the recording light beam L1 can be efficiently irradiated at the target mark position.

Also, in the recording layer 101, it is necessary to irradiate the recording light beam L1 on the irradiating recording mark layer by allowing it to pass through other recording mark layer located on the side of the substrate 102 into which the recording light beam L1 is made incident. For that reason, in the recording layer 101, the recording light beam L1 is exposed repeatedly plural times to the virtual recording mark layer especially in the vicinity of the substrate 102.

In a volume type recording medium for three-dimensionally recording the recording mark RM, such as the optical information recording medium 100, the number of virtual recording mark layers is large. For example, in a virtual recording mark layer of the first layer from the substrate 102, the recording light beam L1 is exposed to other recording mark layer at least 19 times until the information is recorded on a virtual recording mark layer of the twentieth layer.

However, in the recording layer 101, in other recording mark layer, the two-photon absorbing material does not substantially absorb the recording light beam L1, and therefore, influences of the recording light beam L1 to be irradiated on the irradiating recording mark layer are not substantially given to other recording mark layer. As a result, in the recording layer 101, durability as the recording layer 101 can be enhanced as compared with a recording layer for forming the recording mark RM by single-photon absorption or thermal reaction to be caused in proportion to the light intensity.

Furthermore, when the metal fine particle MN which is dispersed in the recording layer 101 is made of a fine particle of Ag, large reinforcement of an electric field due to a surface plasmon effect is expected in view of a relationship with a plasma frequency which is inherent to Ag. Also, it is known that Ag also brings a surface plasmon effect against a recording light beam having a wavelength of about 400 nm which is shorter than that of the recording light beam L1 with 780 nm, and it is possible to use a recording light beam with high energy in conformity with selection of the two-photon absorbing material.

Also, in the recording layer 101, by coordinating the two-photon absorbing material with the metal fine particle MN, the two-photon absorbing material can be surely disposed in the vicinity of the metal fine particle MN. As a result, in the recording layer 101, it is not substantially required to dispose the two-photon absorbing material in a place which is not in the vicinity of the metal fine particle MN, and the use amount of the two-photon absorbing material can be reduced without lowering the recording sensitivity as compared with a method for randomly dispersing the two-photon absorbing material in the recording layer 101.

Also, in general, the metal fine particle MN covers a protective material such as alkanethiols, etc. and stabilizes it for the purpose of preventing coagulation of the metal fine particles MN each other from occurring. In the recording layer 101, by coordinating the two-photon absorbing material directly with the metal fine particle MN, not only the two-photon absorbing material can be disposed in the most vicinity of the metal fine particle MN, but the two-photon absorbing material can be allowed to act as a protective material for this.

Furthermore, the two-photon absorbing material has a coordinated alkyl chain such as an alkylthiol AT substituted with a coordinated terminal group such as a thiol group whose terminal is coordinated with the metal fine particle MN, etc. According to this, in the recording layer 101, since the two-photon absorbing particle PL which is easily coordinated with the metal fine particle MN and simply formed may be dispersed, not only the recording layer 101 can be easily prepared, but the two-photon absorbing material can be stably coordinated with the metal fine particle MN within the recording layer 101.

Also, in the recording layer 101, in view of the fact that the coordinated terminal group in the two-photon absorbing material is a thiol group (SH) having a large coordination power with the metal fine particle MN, the two-photon absorbing material can be stably coordinated with the metal fine particle MN.

Furthermore, in the recording layer 101, by using, as the two-photon absorbing material, a material which absorbs two photons to vaporize and a part of which is substituted with an alkylthiol group which is a structure generally used as a protective material, a two-photon absorbing characteristic and a coordination characteristic with the metal fine particle MN can be made compatible with each other, and the two-photon absorbing material can be allowed to act as a protective material.

Also, in the recording layer 101, it has already been experimentally proven that the material represented by the formula (1) is coordinated as a two-photon absorbing material with the metal fine particle MN while keeping the two-photon absorbing characteristic, and therefore, by using a material having a bisstyrylbenzene structure, it is expected that the foregoing enhancing effect of recording sensitivity is surely obtained.

Furthermore, the optical information recording and reproducing device 1 as an information reproducing device has been configured such that not only the readout light beam L2 having a shorter wavelength than the recording light beam L1 irradiated when the recording mark RM is formed is condensed and irradiated on the optical information recording medium 100 having the recording mark RM composed of bubbles formed by the photoreaction by two-photon absorption, but optical modulation of the readout light beam in the optical information recording medium 100 is detected.

According to this, in the optical information recording and reproducing device 1, crosstalk can be prevented from occurring by making the spot size of the readout light beam L2 small in conformity with the recording mark RM. Accordingly, the information can be recorded on the optical information recording medium 100 in a recording density in conformity with the size of the recording mark RM, and the recording capacity of the optical information recording medium 100 can be enhanced.

Also, in the optical information recording and reproducing device 1, the spot size of the readout light beam L2 is made small in conformity with the recording mark RM. Accordingly, in the case where the recording mark RM exists at the target mark position, the most part of the readout light beam L2 can be irradiated on the recording mark RM at the target mark position, and crosstalk can be efficiently prevented from occurring, thereby enhancing the reproducing characteristic.

According to the foregoing configuration, in the recording layer 101 in the optical information recording medium 100, by disposing the two-photon absorbing material which absorbs the recording light beam L1 to vaporize, thereby forming the recording mark RM in the vicinity of the metal fine particle MN, it is possible to enhance the optical effect of the recording light beam L1 while utilizing the surface plasmon effect to be brought upon irradiation of the recording light beam L1 on the metal fine particle MN, thereby enhancing the recording sensitivity as the recording layer 101. Thus, an optical information recording medium which is able to enhance the recording speed; and an optical information reproducing device, an optical information reproducing method and an optical information recording and reproducing device, each of which is able to make a reproducing characteristic of the optical information recording medium good can be realized.

(3) Second Embodiment

FIGS. 9 to 10 show the Second Embodiment, and portions corresponding to those in the First Embodiment shown in FIGS. 1 to 8 are given the same symbols. The Second Embodiment is different from the First Embodiment in a point that the vaporizable material AM is simply dispersed within a recording layer 151 and disposed in the vicinity of the metal fine particle MN.

(3-1) Configuration of Optical Information Recording Medium

As shown in FIG. 2, similar to the First Embodiment, an optical information recording medium 150 in this embodiment has a configuration in which the recording layer 151 is interposed between the substrates 102 and 103.

In the recording layer 151, the vaporizable material AM and the metal fine particle MN are dispersed in a binder resin serving as a main component. As to the binder resin and the metal fine particle MN, the same materials as those in the First Embodiment are useful.

The metal fine particle MN is dispersed in the binder resin in a state where a protective material is covered (hereinafter referred to as "metal nano particle"). It is preferable that a material of the protective material has a coordinated terminal group having a characteristic such that it is coordinated with the metal fine particle, such as thiols, amines, carboxylic acids, etc. For example, various fatty acids such as oleic acid, etc., alkanethiols, alkaneamines and the like can be used.

The metal nano particle can be prepared by the same techniques as in the two-photon absorbing particle, except for replacing the alkanethiol derivative (formula (1)) in the First Embodiment with the protective material.

In particular, by using a material with high slidability as the material of the protective material, it is possible to enhance the dispersibility in dispersing the once dried metal nano particle in the binder resin.

Incidentally, it has been confirmed that by using oleic acid represented by the formula (3) as the protective material, the once dried metal nano particle can be easily dispersed in a heated thermoplastic resin.

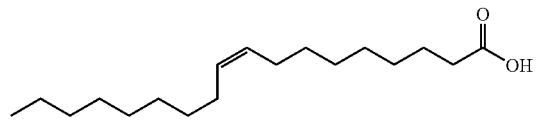

Formula (3)

The vaporizable material AM is not particularly limited so far as it vaporizes upon being irradiated with the recording light beam L1, and known materials such as a material capable of vaporizing by a photoreaction by single-photon absorption, a material capable of vaporizing by a thermal reaction, etc. can be used.

In this optical information recording medium 150, for example, as shown in FIG. 9, by blending the metal fine particle MN with an excess of a thermally vaporizable material AH within the recording layer 151, the thermally vaporizable material AH is surely disposed in the vicinity of the metal fine particle MN. For that reason, it is preferred to use, as the vaporizable material AM, the thermally vaporizable material AH which is inexpensive.

Specifically, it is preferable that the thermally vaporizable material AH is contained in an amount of from 1 to 20% by weight relative to the weight of the whole of the recording layer 151. When the content of the vaporizable material is less than 1%, the vaporizable material AM cannot be surely disposed in the vicinity of the metal fine particle MN, whereas when the content of the vaporizable material AH exceeds 20%, rigidity of the recording layer 151 is insufficient, and hence, such is not preferable.

This thermally vaporizable material AH is not necessarily added only for the purpose of vaporizing as the thermally vaporizable material AH within the recording layer 151 but may be the residual solvent, an additive such as a plasticizer, etc., or a residue of a photopolymerization initiator which has not been consumed (hereinafter referred to as "photopolymerization initiator residue") or the like remaining within the recording layer 151.

From the viewpoints of storage stability of the vaporizable material and recording speed, it is especially preferred to use, as the thermally vaporizable material AH, a material having a vaporization temperature of from 140° C. to 400° C. In the TG/DTA (thermogravimetry/differential thermal analysis) measurement under the following measurement condition, this vaporization temperature is defined to be a temperature at which a weight reduction is generated most vigorously in a TG curve.

[Measurement Condition]
Atmosphere: $N_2$ (under a nitrogen atmosphere)
Temperature rise rate: 20° C./min
Measurement temperature: 40° C. to 600° C.
Used unit: TG/DTA300 (manufactured by Seiko Instruments Inc.)

In the case of using a photosetting type resin, a thermosetting type resin and a solvent dilution type resin as the binder resin, the resin layer 151 is prepared by mixing a liquid binder resin with a vaporizable material and a metal nano particle and drying or curing the mixture. In the case of carrying out heating in a drying or curing process, it is preferred to choose the heating temperature and the thermally vaporizable material AH such that the thermally vaporizable material AH is not volatilized by heating.

For example, in the case of using a thermosetting type resin as the binder resin, since the photopolymerization initiator serves as a starter, and thereafter, a photoreaction serially proceeds, only a very small amount of the photopolymerization initiator is theoretically consumed. However, for the purpose of advancing a photoreaction of the liquid material M1 rapidly and sufficiently, in general, the photopolymerization initiator is blended in an excessive amount relative to the photopolymerization initiator to be actually consumed, and therefore, the photopolymerization initiator residue as the thermally vaporizable material AH can be diffused within the recording layer 151.

Also, in the case where the polymerization initiator is blended in a thermosetting type resin and a thermoplastic resin, since the photopolymerization initiator is not consumed by some reaction but remains within the recording layer 151 as it is, similar to the photosetting type resin, the photopolymerization initiator residue as the thermally vaporizable material AH can be made in a diffused state. Furthermore, in the recording layer 151, it is also possible to diffuse the residual solvent wherein the solvent used as the diluting solvent remains, or the unreacted monomer remaining in the curing treatment, as the thermally vaporizable material AH.

The thermally vaporizable material AH may be vaporized by absorbing the recording light beam L1 to generate heat, or the thermally vaporizable material AH may be vaporized by the heat generation of a binder resin or a component such as an additive to be added to the binder resin, etc.

Also, in the case where the thermally vaporizable material AH is blended in a thermoplastic resin, the recording layer 151 is prepared by adding a metal nano particle NP and the thermally vaporizable material AH to the heated thermoplastic resin, kneading by a kneader, molding and then cooling.

(3-2) Configuration of Optical Information Recording and Reproducing Device

As shown in FIG. 10, an optical information recording and reproducing device 30 according to the Second Embodiment has only a recording and reproducing light source 20 as a light source and executes information recording processing and information reproducing processing by using a light beam outputted from the recording and reproducing light source 20 as the recording light beam L1 and the readout light beam L2.

That is, in the information recording processing, the optical information recording and reproducing device 30 outputs the recording light beam L1 with 405 nm from the recording and reproducing light source 20. Then, the optical information recording and reproducing device 30 irradiates the recording light beam L1 at the target mark position of the optical information recording medium 150 via a collimator lens 21, a beam splitter 22 and an objective lens 23.

At that time, in the optical information recording medium 150, in view of the fact that the thermally vaporizable material AH is disposed in the vicinity of the metal nano particle NP, the optical effect of the recording light beam L1 at the target mark position can be increased several hundred times to several thousand times due to the surface plasmon effect as compared with the light intensity of the recording light beam L1 irradiated actually at the target mark position. As a result, in the optical information recording medium 150, the temperature of the thermally vaporizable material AH can be rapidly increased, and the recording mark RM can be formed by rapidly vaporizing the thermally vaporizable material AH.

In the information reproducing processing, the optical information recording and reproducing device 30 outputs the readout light beam L2 with 405 nm from the recording and reproducing light source 20 and similar to the information recording process, irradiates the readout light beam L2 at the target mark position of the optical information recording medium 150.

Then, in the case where the recording mark RM is recorded at the target mark position, the optical information recording and reproducing device 30 receives the return light beam L3 which is reflected by the optical information recording medium 150 by the objective lens 23 and irradiates the return light beam L3 on a light-receiving element 25 via the beam splitter 22 and a condensing lens 24.

In the light of the above, in the information recording processing, the optical information recording and reproducing device 30 rapidly vaporizes the thermally vaporizable material AH by the surface plasmon effect of the metal fine particle MN to form the recording mark RM and executes information reproducing processing using the readout light beam. L2 having the same wavelength as the recording light beam L1.

(3-3) Action and Effect

In the foregoing configuration, in the recording layer 151 in the optical information recording medium 150, by blending an excess of the vaporizable material AM in the metal fine particle MN, the vaporizable material AM is disposed in the vicinity of the metal fine particle MN.

According to this, in the recording layer 151, irradiation energy of the recording light beam L1 which is necessary for vaporizing the vaporizable material AM due to the surface plasmon effect to be caused by the metal fine particle MN can be reduced, and the recording time until the recording mark RM is formed can be shortened.

Also, in the recording layer 151, since the vaporizable material AM can be disposed in the vicinity of the metal fine particle MN only by a treatment of mixing the vaporizable material AM with the binder resin in which the metal fine particle MN is dispersed, the optical information recording medium 150 can be simply prepared.

Furthermore, by disposing the thermally vaporizable material AH which is vaporized by heat in the vicinity of the metal fine particle MN, durability against light can be enhanced as compared with a vaporizable material which undergoes single-photon absorption, and reliability as the optical information recording medium 150 can be enhanced.

Also, in view of the fact that the thermally vaporizable material AH is a photopolymerization initiator capable of generating a reaction initiation factor in conformity with light, the thermally vaporizable material AH is able to efficiently absorb the recording light beam L1 with 405 nm to form the recording mark RM comparatively rapidly.

According to the foregoing configuration, in the recording layer 151, since the vaporizable material AM is disposed in the vicinity of the metal fine particle MN by blending an excess of the vaporizable material AM in the metal fine particle MN, the recording speed can be enhanced due to the surface plasmon effect of the metal nano particle NP only by dispersing the generally used metal nano particle NP and the vaporizable material AM in the recording layer 151.

(4) Other Embodiments

In the foregoing embodiments, while the case where various resin materials are used as the binder resin has been described, the invention is not limited thereto. For example, if desired, various additives, sensitizing coloring matters, for example, cyanine based, coumarin based and quinoline based coloring materials, etc., and so on may be added.

Furthermore, in the foregoing First Embodiment, while the case where the two-photon absorbing material capable of absorbing a light beam having a wavelength of 780 nm is used has been described, the invention is not limited thereto, and for example, a two-photon absorbing material capable of absorbing a light beam having a wavelength of 405 nm may be used. Even in that case, by using Ag as the metal fine particle MN, it is possible to generate the surface plasmon effect similar to the foregoing embodiments, thereby enhancing the recording speed.

Furthermore, while the case where in the foregoing First Embodiment, the two-photon absorbing material as the vaporizable material AM is coordinated with the metal fine particle MN, whereas in the Second Embodiment, an excess of the thermally vaporizable material AH as the vaporizable material AM is blended in the metal fine particle MN has been described, the invention is not limited thereto, and the First and Second Embodiments can be properly combined. For example, an excess of the two-photon absorbing material may be blended in the metal fine particle MN, or the thermally vaporizable material, a part of which is substituted with an alkylthiol group, may be coordinated with the metal fine particle MN.

Also, for example, as shown in FIG. 11, it is possible to add a structure of drawing the vaporizable material AM near or coordinating it with a tip of a protective material PC for covering the metal fine particle MN. According to this, it is possible to surely dispose the vaporizable material AM in the vicinity of the metal fine particle MN without causing any changes in the structure as the vaporizable material AM, namely without giving any influences against the characteristics as the vaporizable material AM. That is, the vaporizable material AM may be disposed within the range where an electric field is reinforced by the surface plasmon effect to be brought by the metal fine particle MN. Incidentally, it is known that near-field light due to the surface plasmon effect long-distance propagates to 0.5 mm under a special condition. Also, in general, the propagation distance of near-field light is about 100 nm. Accordingly, it may be considered that the effects of the invention can be obtained by disposing the vaporizable material AM at a position of less than 0.5 mm, and preferably less than 100 nm from the surface of the metal fine particle MN.

Furthermore, in the foregoing embodiments, while the case where the recording light beam L1 and the readout light beam L2 are each irradiated from the surface on the side of the substrate 102 of the optical information recording medium 100 has been described, the invention is not limited thereto. Each light or the light beams may be irradiated, respectively from any one or both of the surfaces by, for example, irradiating the recording light beam L1 from the surface on the side of the substrate 103 or the like.

Furthermore, in the foregoing First Embodiment, while the case where the readout light beam L2 having a shorter wavelength than the recording light beam L1 is used has been described, the invention is not limited thereto. For example, by switching and using two objective lenses having a different numerical aperture from each other, the spot size may be changed while using the recording light beam L1 and the readout light beam L2 each having the same wavelength.

Furthermore, in the foregoing Second Embodiment, the wavelength of each of the recording light beam L1 and the readout light beam L2 to be outputted from the recording light source 10 may be another wavelength other than a wavelength of 405 nm, so long as the recording mark RM composed of bubbles may be adequately formed in the vicinity of the target mark position within the recording layer 101.

Furthermore, in the foregoing embodiments, while the case where the recording layer 101 of the optical information recording medium 100 is formed in a regular square shape or rectangular shape having one side of about 50 mm and having a thickness t1 of from about 0.05 to 1.0 mm has been described, the invention is not limited thereto, and other arbitrary dimension may be adopted, or various shapes with a varied dimension, such as a rectangular parallelepiped, etc. may be adopted. In that case, it is desirable that the thickness t1 in the Z-direction is defined while taking into account a transmittance of each of the recording light beam L1 and the readout light beam L2, etc.

Also, by forming the optical information recording medium 100 in a disc shape, the recording light beam L1 and the readout light beam. L2 may be irradiated while rotating the optical information recording medium 100 such that the recording marks RM are arranged concentrically or helically. For example, in order to obtain a capacity of 5 times or more of a two-layered BD having a recording capacity of 250 GB, a thickness of the recording layer 101 is desirably 100 μm or more.

In response to this, the shape of the substrates 102 and 103 is not limited to a regular square plate shape or rectangular plate shape but may be a shape of every sort in conformity with the recording layer 101. Also, the material of the substrates 102 and 103 is not limited to the glass but may be, for example, a polycarbonate or the like, in a word, it may allow the recording light beam L1, the readout light beam L2 and the return light beam L3 to pass therethrough in a transmittance to some extent. Also, by disposing a light-receiving element for receiving transmitted light of the readout light beam L2 in place of the return light beam L3 and detecting light modulation of the readout light beam L2 in conformity with the presence or absence of the recording mark RM, the information may be reproduced on the basis of the light modulation of the readout light beam L2. Furthermore, in the case where a desired intensity is obtained by the recording layer 101 alone, or other cases, the substrates 102 and 103 may be omitted from the optical information recording medium 100.

Furthermore, in the foregoing embodiments, while the case where the optical information recording medium 100 as an optical information recording medium is configured of the recording layer 101 as a recording layer has been described, the invention is not limited thereto, and the optical information recording medium may be configured of a recording layer composed of other configuration of every sort.

INDUSTRIAL APPLICABILITY

The invention can also be utilized for optical information recording and reproducing devices for recording or reproducing information with a large capacity, for example, screen image contents, sound contents, etc. on a recording medium such as optical information recording media, etc.

The invention claimed is:

1. An optical information recording method comprising irradiating an optical information recording medium containing a metal fine particle capable of generating local plasmon resonance on recording light to be condensed at the time of recording information and a vaporizable material with the recording light and vaporizing the vaporizable material by light absorption on the basis of the recording light or heat following the light absorption, thereby forming a recording mark composed of a cavity in conformity with the recording light, wherein, the vaporizable material is coordinated with the metal fine particle, the vaporizable material has an alkyl chain whose terminal is substituted with a coordinated terminal group which is coordinated with the metal fine particle, the coordinated terminal group is a thiol group, the vaporizable material is one in which a part of a two-photon absorbing material capable of being vaporized by two-photon absorption is substituted with an alkylthiol group, and the vaporizable material is represented by formula (2):

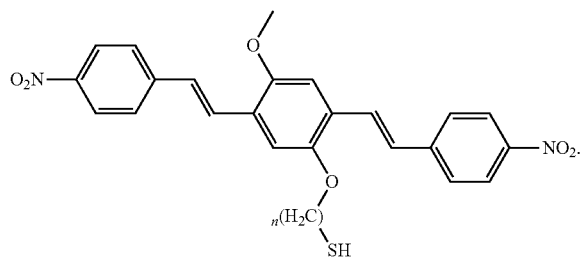

2. The optical information recording method according to claim 1, wherein the metal fine particle is a fine particle of Ag.

3. The optical information recording method according to claim 1, wherein the vaporizable material is blended in an excessive amount in the metal fine particle.

4. The optical information recording method according to claim 2, wherein
the vaporizable material is a thermally vaporizable material capable of being vaporized by heat.

5. The optical information recording method according to claim 1, wherein the vaporizable material is a photopolymerization initiator capable of generating a reaction initiation factor in conformity with light.

6. The optical information recording method according to claim 3, wherein the vaporizable material is coordinated with a protective material for covering the metal fine particle.

7. An optical information recording medium comprising
a recording layer for irradiating an optical information recording medium containing a metal fine particle capable of generating local plasmon resonance on recording light to be condensed at the time of recording information and a vaporizable material with the recording light and vaporizing the vaporizable material by light absorption on the basis of the recording light or heat following the light absorption, thereby forming a recording mark composed of a cavity in conformity with the recording light,
wherein,
the vaporizable material is coordinated with the metal fine particle,
the vaporizable material has an alkyl chain whose terminal is substituted with a coordinated terminal group which is coordinated with the metal fine particle,
the coordinated terminal group is a thiol group,
the vaporizable material is one in which a part of a two-photon absorbing material capable of being vaporized by two-photon absorption is substituted with an alkylthiol group, and
the vaporizable material is represented by formula (2):

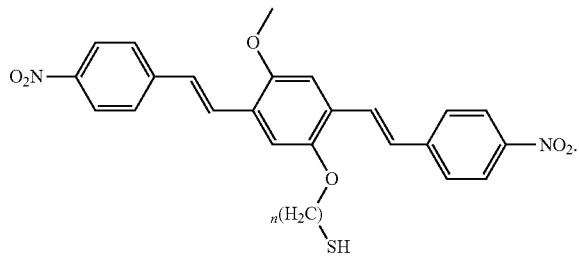

* * * * *